United States Patent Office 3,559,510
Patented Feb. 2, 1971

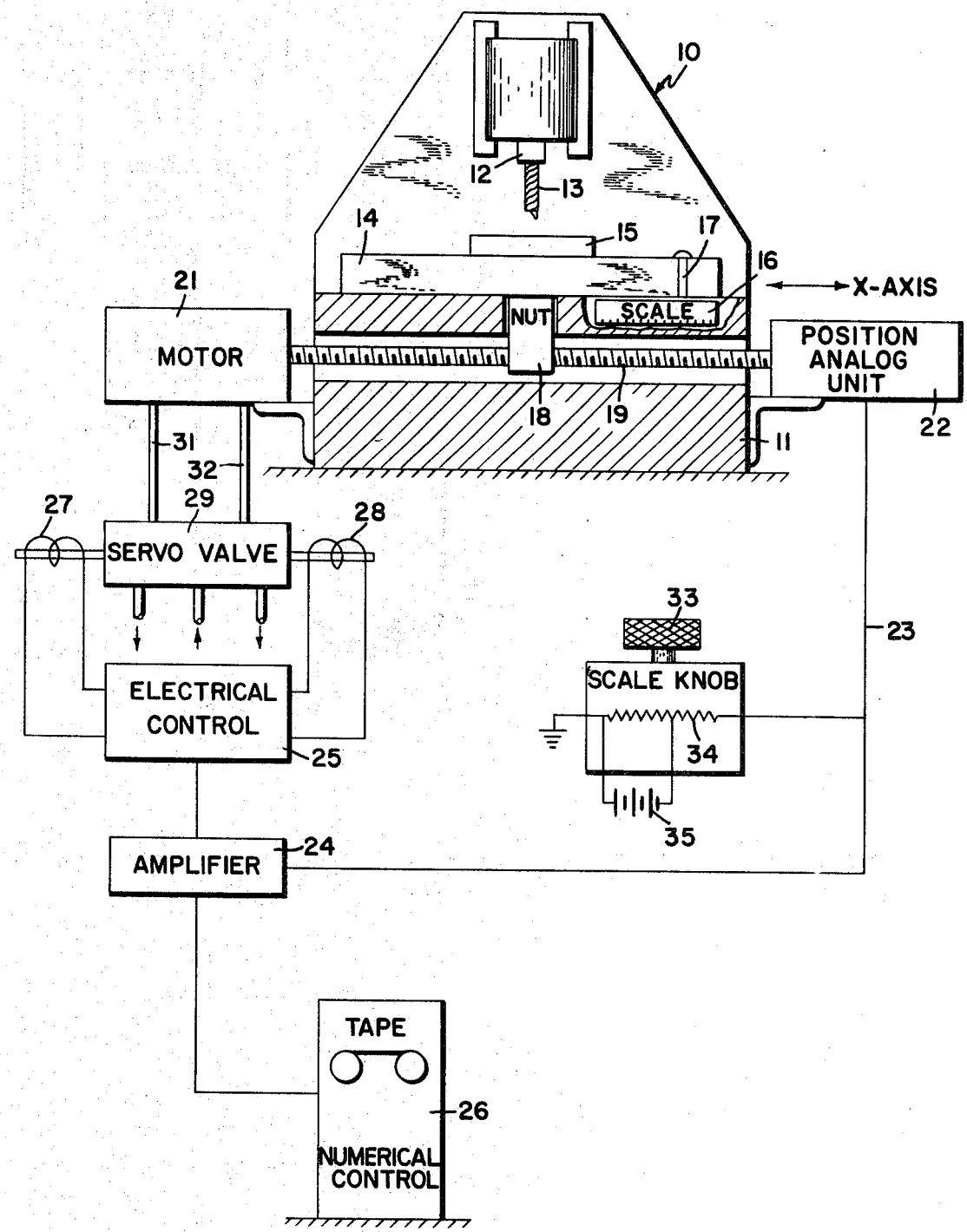

3,559,510
NUMERICALLY CONTROLLED MACHINE TOOL WITH MANUAL MEANS FOR FINE ADJUSTMENT
Alfred T. Blackburn, West Boylston, Mass., assignor to The Heald Machine Company, Worcester, Mass., a corporation of Massachusetts
Filed Sept. 20, 1968, Ser. No. 761,078
Int. Cl. B23b 39/06
U.S. Cl. 77—5     3 Claims

ABSTRACT OF THE DISCLOSURE

The invention relates to a machine tool having numerically-controlled positioning of the workpiece relative to the spindle and a manual means for use on occasion to obtain a more precise positioning than can be obtained by the numerically-controlled positioning system.

BACKGROUND OF THE INVENTION

In the machining of a workpiece where a substantial number of operations are to be carried out, it is common practice to use a jig borer with numerical control. This type of machine has a very rigid tool spindle and a table positioning control that is very accurate, so that the cost is necessarily very high, especially when tool-changing capability is also provided. Where a great many holes are to be machined to very accurate center distances, such a machine is necessary and appropriate. However, many workpieces have a large number of operations, i.e., drilling, boring, tapping, counterboring, etc., but only a few of them need to be done with a high degree of centerline accuracy. The use of an expensive machine in such a situation seems inappropriate, but those few operations must still be performed accurately. An alternative would be to perform these few accurate operations on the expensive machine and then do the rest of the operations on a less accurate, inexpensive machine; however, this would mean two setups for the series of operations, plus the loss of machine time and labor involved. Furthermore, it is not always possible to divide a series of machining operations into a first group of inaccurate operations and a second group of accurate operations wherein each group is to be performed at one time separately from the other group. In other words, it is necessary in most cases to perform the operations in such an order that the accurate and inaccurate operations are performed in a mixed order. These and other difficulties experienced with the prior art devices have been obviated in a novel manner by the present invention.

It is, therefore, an outstanding object of the invention to provide a machine tool which is capable of performing machining operations to a high degree of accuracy, but whose construction is simple and inexpensive.

Another object of this invention is the provision of a machine tool which takes advantage of the fact that among a series of operations on a machine tool often only a few need to be performed with fine centerline accuracy.

A further object of the present invention is the provision of a machine tool which can perform a series of machining operations automatically with coarse accuracy and in which the centerline accuracy during a given operation can be improved, if desired, manually.

It is another object of the instant invention to provide an automatic machine tool having the attributes of a jig borer, but can be sold for a price only slightly higher than a drill press.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool having a base, having a rotatable spindle accurately and rigidly mounted on the base, having a table slidably located on the base for holding and positioning a workpiece in line with the spindle, and having an automatic means for locating the support means in a series of predetermined positions relative to the base with an accuracy of a relatively coarse order. Visual means is provided for indicating at all times the position of the support means with an accuracy of a fine order and manual means for adjusting the support means position from a coarse position as set by the automatic means to a fine position as indicated by the visual means.

BRIEF DESCRIPTION OF THE DRAWINGS

The character of the invention, however, may be best understood by reference to one of its structural forms, as illustrated by the accompanying drawings, in which:

The single figure of drawings is a schematic view of a machine tool embodying the principles of the present invention.

DESCRIPTION OF THE PREFERRED EMBODIMENT

As is evident in the drawing, the machine tool, indicated generally by the reference numeral 10, is of the type shown and described in the patent of Jacobson et al. No. 3,266,141 which issued Aug. 16, 1966. The machine tool is provided with a base 11 on which is rigidly and accurately mounted a spindle 12. This spindle is capable of rotation with a tool 13 at high speed and with substantial side thrust or tool pressure without appreciable deflection; the manner of mounting this spindle is that normally issued in jig borers, particularly with respect to its ability to maintain centerline accuracy despite substantial work load. A support means, such as a table 14 is mounted on the base for sliding motion with a workpiece 15 laterally of the spindle axis along the X-axis. It will be understood that a similar table will be provided in a commercial embodiment of the machine tool to provide for positioning of the workpiece along the Y-axis. A very accurately ruled scale 16 is mounted on the base, while a magnifier-and-hairline apparatus 17 is located on the table or vice versa; this apparatus is also provided with a differential means, so that in the preferred embodiment the position of the table relative to the base can be determined visually to an accuracy of 0.0001".

A nut 18 is fastened to the underside of the table and through it is passed a lead screw 19. One end of the screw is driven by a motor 21, which for purposes of illustration, is shown as being a rotary hydraulic actuator. The other end of the screw is fastened to a position analog unit 22 which has been calibrated to generate an error signal at all times proportional to the error in position of the table due to inaccuracies in the lead screw 19 and other elements of the machine. This error signal is carried by an electrical line 23 to an amplifier 24 which serves an electrical control 25. The error signal in the line 23 can be adjusted up or down by use of a knob 33 which controls a potentiometer 34 connected across a D.C. source 35. The amplifier also receives instruction signals from a numerical control console 26 which, in the preferred embodiment, reads primary instructions from a roll of punched tape. The amplifier combines the instruction signal with the error signal and transmits the resultant signal to the electrical control. The control operates the oppositely disposed coils 27 and 28 of a servo valve 29. This valve determines the flow of pressure fluid toward and away from the motor 21 through conduits 31 and 32; by use of the valve a predetermined amount of fluid is added to and flows through the motor to rotate the screw 19 a predetermined amount, so that the table is moved by a certain amount.

The operation of the machine tool will now be readily understood in view of the above description. With the spindle 12 and the tool 13 rotating and the workpiece 15 mounted on the table 14, the appropriate tape is presented to the reading heads in the numerical control console 26. The instructions for the next position of the table relative to the spindle axis are transmitted to the amplifier. It will be understood that the description of operation which follows has to do only with the X-axis, but that a similar procedure is simultaneously being carried out by a table and associated equipment operating along the Y-axis. The amplified signal from the amplifier 24 is transmitted to the electrical control 25 which operates through the servo valve 29 and the motor 21 to move the table a predetermined amount, the initial position being known. The resulting position of the table and workpiece is accurate only within the limits of the equipment; as a practical matter, the described equipment locates the workpiece relative to the spindle axis with an accuracy of .001", which can be considered a "coarse" adjustment. Actually, this is accurate enough for a high proportion of the machining operations in a typical series of machining operations on a workpiece. Occasionally, however, an operation is called for which requires a higher centerline accuracy. For instance, a typical series of operations on a workpiece would involve the drilling of a number of holes, counterboring and tapping some of them, and boring some of them with considerable accuracy of diameter, the centerlines of some of the bores are to be located very accurately relative to one another. While the table position will not affect the finished bore diameter appreciably (since a boring bar is capable of generating an accurately-dimensioned bore despite the fact that it is presented eccentrically to the rough bored hole), it will, of course, result in the finished bores having their centerlines located the wrong distance apart. Therefore, in the past the machinist would be forced to perform the entire series of machining operations on an expensive jig borer. In that case, the table would be located very accurately for every operation whether that accuracy of location was necessary or not.

In the operation of the present invention, after the workpiece has been coarsely located by the motor 21 and the lead screw 18, the operator checks the blueprint to see if the upcoming operation requires accuracy of centerline location. In practice, those few machining operations in the series that require a high degree of centerline accuracy would be clearly indicated as such. In a sophisticated version of the invention, the tape in the console 26 would automatically stop table movement, but would not advance the spindle and tool longitudinally for the machining operation in the usual manner. Instead, the progress of the cycle would be interrupted and a signal lamp energized. The operator sees the lamp and realizes that the upcoming operation is a "special" one. He then observes the scale 16 through the magnifier-and-hairline apparatus 17. By observing the differential portion of the apparatus and scale he can read the table position with an accuracy of .0001". He can find from the blueprint (or, perhaps from printed instructions on the tape) the desired position of the workpiece. He turns the knob 33 to adjust the potentiometer 34 and this action impresses a selected D.C. voltage on the line 23. Now, this line already carries a D.C. voltage error signal from the position analog unit 22. These two signals combine algebraically to give a resultant voltage which operates to energize the motor 21 slightly to move the table a small amount. The operator turns the knob 33 in the proper direction and watches the scale 16 until the table position is exactly correct to .0001".

It can be seen, then, that a series of machining operations can be carried out on the relatively inexpensive machine tool of the present invention that formerly required an expensive jig borer. The only sacrifice is the time required at the time of the "special" operation to make a manual adjustment of the table position while observing the optical position indicator. It is necessary to manufacture the spindle and its head for rigidity and accuracy at, presumably, the same cost as the corresponding part of a jig borer. The automatic positioning equipment can be quite simple and inexpensive, while the visual indicator and the manual adjustment represent inexpensive, readily-obtainable equipment which can be incorporated with little difficulty. The operator need not be particularly skilled to be able to make these adjustments. A presently-existing machine can be readily adapted at small cost to this operation, so long as it has a rigidly- and accurately-mounted spindle, along with automatic table positioning and tool storage and changing.

The scale 16 and the associated magnifier-and-hairline apparatus 17 is of the type known as the Micro-Line Model VTL–I measuring system manufactured by the Micro-Line Inc. of Jamestown, N.Y.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:
  (a) a base,
  (b) a rotatable spindle accurately mounted on the base,
  (c) support means slidably located on the base for holding and positioning a workpiece in line with the spindle,
  (d) automatic means for locating the support means in a series of predetermined positions relative to the base with an accuracy of a coarse order, the automatic means including a nut-and-screw feed mechanism driven by a motor and a position analog unit driven by the screw and calibrated to generate a signal proportional to the error at any point in the screw which adjusts the operation of the motor, the signal from the analog unit being an electrical voltage whose value is proportional to the error,
  (e) a visual means for indicating at all times the position of the support means with an accuracy of a fine order,
  (f) and manual means including a potentiometer connected to add to or subtract from the said electrical voltage for adjusting the support means position on occasion from a coarse position as set by the automatic means to a fine position as indicated by the visual means.

2. A machine tool as recited in claim 1, wherein the motor is regulated by a signal numerical control apparatus and a signal from the analog unit is combined with the signal from the numerical control apparatus.

3. A machine tool as recited in claim 1, wherein the visual means consists of a scale on the base and magnifier and hairline on the support means and wherein the manual means and the visual means are located close together.

References Cited

UNITED STATES PATENTS 3,063,311 11/1962 Beckwith et al. ........ 77—32
2,809,540 10/1957 Schultze .............. 77—5

FRANCIS S. HUSAR, Primary Examiner

U.S. Cl. X.R.

77—32.2, 63